Nov. 10, 1953     J. MIGNOLET     2,658,730
SERVING, MIXING, AND COOKING UTENSIL
Filed March 3, 1952
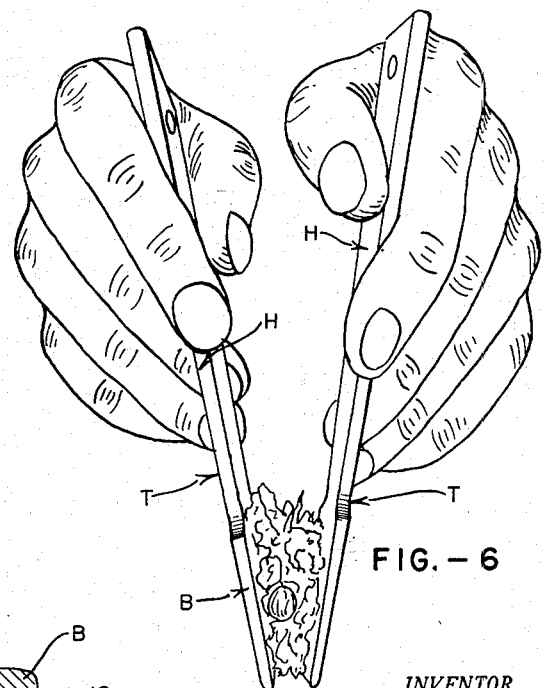
INVENTOR.
JEAN MIGNOLET
BY
Lamphere and Van Valkenburgh
ATTORNEYS Patented Nov. 10, 1953

2,658,730

UNITED STATES PATENT OFFICE 2,658,730

SERVING, MIXING, AND COOKING UTENSIL

Jean Mignolet, Denver, Colo.

Application March 3, 1952, Serial No. 274,541

4 Claims. (Cl. 259—144)

This invention relates to a utensil or tool for use in serving, mixing and cooking of food.

One of the objects of my invention is to produce a utensil or tool which can be used either singly or in pairs to aid in and make more easy the preparation and serving of food.

Another object is to so construct such a tool that when used singly, as for mixing or stirring a liquid, such can accomplish a thorough intermixing and blanding in a minimum of time and effort.

A further object is to so construct a tool that when used in pairs for mixing solid and/or liquid foods, such as salads with dressing, the mixing and blending can be thoroughly done in an easy manner and with less possibility of the food catching on the tool or being spilled from the mixing container as when a spoon and fork are used.

A still further object is to produce a serving utensil or tool which, when used in pairs either by two hands or with a single hand, will permit the server to make a serving of solid food in a dripless manner and without any messy scattering.

Still another object is to produce a tool or utensil in the form of a pallet or paddle which will be so constructed that it will have unlimited efficient uses about a household, besides its primary use in connection with the serving, mixing and cooking of food, which will be cheap to manufacture from various types of material and also readily and easily cleaned after any use.

Other objects of my invention will become apparent from the following description taken in connection with the accompanying drawing in which:

Figure 1 is a flat side view of a preferred construction of the utensil or tool embodying the invention;

Figure 2 is an edge view of the tool;

Figures 3 and 4 are sectional views showing details of construction, said views being taken, respectively, on the lines 3—3 and 4—4 of Figure 1;

Figure 5 is a view showing the tool being used to stir a liquid; and

Figure 6 is a view showing two of the tools being used to serve a food.

Referring to the drawing in detail, my improved utensil or tool is indicated generally by the letter T and it comprises a body B having an integral handle H. The tool is made of one piece of material and the material can be selected as desired as long as such is capable of producing a sufficiently rigid tool and also one that will withstand heat and wear. Suitable materials may be wood, plastic or metal.

It will be noted from the drawing that the body B is of general rectangular shape and that the handle extends from one end thereof, with the handle and body being joined together in a smooth contoured line. It will be further noted that the handle, adjacent the body, is narrowed slightly in order to permit easy holding or grasping. The handle also has a hole 10 at its free end so that the tool can be hung on a nail or have a looped member attached thereto.

The handle and the body are both relatively thin and the longer side edges 11 and 12 of the body are substantially straight. These edges however do converge slightly towards the end 13 of the body which is opposite that from which the handle extends. This end 13 is also provided with a substantially straight edge and it is to be noted, as best shown in Figure 3, that the opposite faces of the body from a point spaced slightly back of the edge to the edge is tapered as indicated at 14 and 15, thereby producing a beveled blunt edge of less thickness than the thickness of the body of the tool.

The two faces of the body of the tool are provided with like dished surfaces 16 and 17. These dished surfaces are at the central part of each face and each has a depth at its center of approximately one-third the thickness of the body of the tool. The dished surfaces are somewhat elliptical with the major axis extending in the same direction as the longitudinal axis of the body.

In addition to the dished surfaces on the body faces, the body is provided with an opening 18 joining the central portions of these two dished surfaces. This opening is also somewhat elliptical in shape and of considerable size so as to allow liquid even when quite thick to easily pass therethrough. The opening has extending from opposite sides thereof slots 19 and 20. The slots are at the ends of the elliptical opening and thus extend in the longitudinal direction of the body. The closed ends of the slots are rounded so that food particles will not easily be caught therein.

A tool or utensil constructed as shown has many efficient uses in aiding in the serving, mixing and cooking of food. The tool is an excellent one for mixing or stirring liquids. The blunt end 13 of the body of the tool having the straight edge permits a good scraping action on the bottom of a pan such as the pan P shown in Figure 5 wherein the tool is illustrated as employed in stirring a liquid. Due to the fact that most pans also have their walls flared slightly from the bottom towards the top, the side edges 11 and 12 of the tool will have a close fit with the wall of the pan, since these sides edges 11 and 12 diverge slightly towards the end 13 of the tool. The close relationship between a side edge and a pan is also illustrated in Figure 5. Because of the hole in the tool it is believed to be apparent that during stirring of any liquid some of this liquid can pass through the hole 18 and also through the slots 19 and 20 and increase the mixing action as the tool is moving around the pan.

The blunt end 13 with its tapered surfaces also insures that the tool can be used very efficiently in scraping out bottoms of pans, bowls and other dishes, since the tool can be placed at an angle to the bottom of the pan and pushed across the the bottom surface with the result that the end will scoop under any material clinging to the bottom surface. The blunt edge also aids in lifting an article from a flat surface.

The tool is also very useful in mixing salads, particularly when two of the tools are used together. The tools are more efficient than two spoons or a fork and spoon, which are usually the implements employed in mixing salads. The blunt, straight end of the tool insures that more dressing will be scooped off the bottom and mixed with the salad ingredients as the tools are operated. Also, there wil be no prongs, as there are on a fork, to pierce any salad material and cause such to cling to the tool.

When it comes to serving food, the tools can be used to excellent advantage, particularly when employed in pairs. As illustrated in Figure 6, two of the tools are being used for serving with one tool in each hand. A food being served, such as for example salad, can be very easily lifted out of a salad bowl and placed on a plate without any stringing and scattering of the ingredients of the salad. The dished surfaces on the tools will tend to give a good cupped griping action on the salad material and will maintain the material between the two bodies of the tools being used. Since the tools have no sharp points such as those of a fork, there is little likelihood of any salad material falling off from the tools as it is transferred from the salad bowl to the plate.

The tools can also be used by a single hand to also make excellent servers. They can be made of such size that both tools can be easily manipulated by the fingers and thumb of a single hand, and it is readily possible to grasp any food from a serving dish being held in the other hand and transfer this food to a plate. Due to the blunt ends with the tapered edges the body of the tool can be quickly and easily placed under any food to be picked up. It is also to be noted that with the hole in the body members the tools when used to pick up food for serving will easily permit any liquid on the food to drain off before transfer from the serving dish to a plate. If any squeezing is desired to eliminate liquids from the food being served, such squeezing is easily accomplished between the bodies of the two tools being employed. The holes permit the liquid to flow out from the food being squeezed. If two spoons should be used for serving, the dished parts of the spoons would tend to hold liquid and it is readily seen that a messy job of serving can easily result. This is all eliminated when the improved tools are used for serving.

There are innumerable uses for my improved tool, either when used alone or with another like tool. A tool can be used to skim particles, etc. off a liquid. A tool by itself can be used for turning articles of food or for lifting them out of a pan by using two of the tools. Pans and other articles can also be clamped onto and lifted out of any place, such as a hot oven. A single tool can also be used to "scoop up" an article. Other kitchen and serving uses readily suggest themselves. There are other uses for the tool around the household besides mixing, serving and cooking. For example, a tool could have a cloth wrapped around its body and the tool could then be used, as for example, in the cleaning out of radiators, corners and other hard to get in places and also slats of Venetian blinds. The tool can even be used for mixing cement, plaster and other material if desired.

Being aware of the possibility of modifications in the particular tool shown and described, all without departing from the fundamental principles of my invention, I desire it to be understood that the scope is not to be limited in any manner except in accordance with the appended claims.

What is claimed is:

1. A food serving, mixing and cooking tool of the kind referred to comprising a single piece or material formed to have a generally rectangular body portion with its longer side being not greater than twice the length of its shorter side and an integral handle extending from one end, said body portion also being of a length less than one-half the length of the handle and made relatively thin with its longer side edges substantially straight and its end opposite the handle having a substantially straight edge at right angles to the longitudinal axis of the tool, said body portion having on at least one face a centrally positioned dished surface which is surrounded by a flat surface all in a single plane and being of substantial width and length but with an area not greater than one-half the area of the face of the body portion and said body being provided with an opening therethrough at the central portion of the dished surface.

2. The tool of claim 1 in which the other face of the body portion has a dished surface like the described dished surface and there are slots narrower than the opening extending oppositely therefrom in the longitudinal direction of the body portion.

3. The tool of claim 1 in which the other face of the body portion has a dished surface like the described dished surface and the longer side edges of the body portion converge slightly toward the end opposite the handle.

4. The tool of claim 1 in which the straight edge of the body portion opposite the handle is uniformly blunt from one side of the body portion to the other and said bluntness is formed by a tapering of the body toward the edge with both faces of the body adjacent the edge having sloping surfaces.

JEAN MIGNOLET.

References Cited in the file of this patent

UNITED STATES PATENTS

| Number | Name | Date |
|---|---|---|
| 1,460,007 | Williams | June 26, 1923 |
| 1,997,953 | Van Der Kuy | Apr. 16, 1935 |
| 2,526,863 | Gilliam | Oct. 24, 1950 |

FOREIGN PATENTS

| Number | Country | Date |
|---|---|---|
| 124,236 | Austria | Apr. 15, 1931 |